United States Patent
Ramaiah et al.

(10) Patent No.: US 11,112,065 B2
(45) Date of Patent: *Sep. 7, 2021

(54) SOLID STATE LAMP FOR RETROFIT

(71) Applicant: CURRENT LIGHTING SOLUTIONS, LLC, East Cleveland, OH (US)

(72) Inventors: Raghu Ramaiah, East Cleveland, OH (US); Thomas Alexander Knapp, East Cleveland, OH (US); Benjamin Lee Yoder, East Cleveland, OH (US); James William Firis, East Cleveland, OH (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,766

(22) Filed: Aug. 21, 2020

(65) Prior Publication Data
US 2020/0378564 A1    Dec. 3, 2020

Related U.S. Application Data

(63) Continuation of application No. 15/752,898, filed as application No. PCT/US2016/052579 on Sep. 20, 2016, now Pat. No. 10,788,163.

(Continued)

(51) Int. Cl.
*F21V 29/83*   (2015.01)
*F21V 29/67*   (2015.01)
(Continued)

(52) U.S. Cl.
CPC ............ *F21K 9/232* (2016.08); *F21K 9/238* (2016.08); *F21V 29/67* (2015.01); *F21V 29/83* (2015.01);
(Continued)

(58) Field of Classification Search
CPC .......... F21K 9/232; F21K 9/238; F21V 29/83; F21V 29/67
See application file for complete search history.

(56) References Cited

U.S. PATENT DOCUMENTS 7,434,964 B1   10/2008   Zheng et al.
7,458,706 B1   12/2008   Liu et al.
(Continued)

FOREIGN PATENT DOCUMENTS

CN    101373604 A    2/2009
CN    101493207 A    7/2009
(Continued)

OTHER PUBLICATIONS

Office Action Issued in connection with corresponding Chinese Application No. 201680054982.X dated Apr. 7, 2020.
(Continued)

*Primary Examiner* — Karabi Guharay
(74) *Attorney, Agent, or Firm* — Buckley, Maschoff & Talwalkar LLC

(57) ABSTRACT

A HID solid state retrofit lamp includes a circumferential array of solid state light sources mounted on circuit boards, a heat sink located in the lamp's interior volume, and a fan positioned in the interior volume to force airflow across the heat sink. A capper assembly includes at least one aperture to vent the interior volume, and an intermediate circuit board within the capper assembly. The intermediate circuit board distributes electrical power to the circuit boards by tabs and contacts extending from the boards that are mechanically bonded together. An optical transmissive shield is positioned exterior to the circumferential array, and can include prismatic structures to direct light emitted from the LED sources in an off axis direction.

17 Claims, 7 Drawing Sheets

Related U.S. Application Data

(60) Provisional application No. 62/221,400, filed on Sep. 21, 2015.

(51) Int. Cl.
*F21K 9/232* (2016.01)
*F21K 9/238* (2016.01)
*F21Y 115/10* (2016.01)
*F21Y 107/30* (2016.01)

(52) U.S. Cl.
CPC ....... *F21Y 2107/30* (2016.08); *F21Y 2115/10* (2016.08)

(56) References Cited

U.S. PATENT DOCUMENTS

| | | | |
|---|---|---|---|
| 7,488,093 B1 | 2/2009 | Huang et al. |
| 7,513,653 B1 | 4/2009 | Liu et al. |
| 7,520,640 B1 | 4/2009 | Shuai et al. |
| 7,534,015 B2 | 5/2009 | Xu et al. |
| 7,607,803 B2 | 10/2009 | Zhang et al. |
| 7,628,522 B2 | 12/2009 | Yu et al. |
| 7,631,988 B2 | 12/2009 | Xie et al. |
| 7,637,635 B2 | 12/2009 | Xiao et al. |
| 7,637,636 B2 | 12/2009 | Zheng et al. |
| 7,637,637 B2 | 12/2009 | Liu et al. |
| 7,648,258 B2 | 1/2010 | Shuai et al. |
| 7,654,699 B2 | 2/2010 | Chang et al. |
| 7,654,701 B2 | 2/2010 | Zhang et al. |
| 7,654,702 B1 | 2/2010 | Ding et al. |
| 7,661,845 B2 | 2/2010 | Zhang |
| 7,665,864 B2 | 2/2010 | Zheng et al. |
| 7,670,028 B2 | 3/2010 | Liu et al. |
| 7,674,016 B2 | 3/2010 | Zhang et al. |
| 7,682,049 B2 | 3/2010 | Zheng et al. |
| 7,682,050 B2 | 3/2010 | Xiang et al. |
| 7,695,162 B2 | 4/2010 | Zhang et al. |
| 7,722,222 B2 | 5/2010 | Zheng |
| 7,726,846 B2 | 6/2010 | Yang et al. |
| 7,726,851 B2 | 6/2010 | Shuai et al. |
| 7,742,306 B2 | 6/2010 | Shuai et al. |
| 7,744,247 B2 | 6/2010 | Zhang et al. |
| 7,744,250 B2 | 6/2010 | Lee et al. |
| 7,744,251 B2 | 6/2010 | Liu et al. |
| 7,748,876 B2 | 7/2010 | Zhang et al. |
| 7,753,560 B2 | 7/2010 | Xu et al. |
| 7,758,214 B2 | 7/2010 | Lee et al. |
| 7,766,513 B2 | 8/2010 | Zhang et al. |
| 7,784,973 B2 | 8/2010 | Zhang et al. |
| 7,794,116 B2 | 9/2010 | Shuai et al. |
| 7,810,957 B2 | 10/2010 | Zeng et al. |
| 7,832,899 B2 | 11/2010 | Zheng |
| 7,837,362 B2 | 11/2010 | Zhang |
| 7,857,486 B2 | 12/2010 | Long et al. |
| 7,862,210 B2 | 1/2011 | Zhang et al. |
| 7,874,702 B2 | 1/2011 | Shuai et al. |
| 7,888,851 B2 | 2/2011 | Yang et al. |
| 7,950,828 B2 | 5/2011 | Zhang et al. |
| 7,967,473 B2 | 6/2011 | Huang et al. |
| 8,016,453 B2 | 9/2011 | Xiao et al. |
| 8,052,300 B2 | 11/2011 | Zhang et al. |
| 8,052,304 B2 | 11/2011 | Yang et al. |
| 8,109,657 B2 | 2/2012 | Huang et al. |
| 8,226,273 B2 | 7/2012 | Lai |
| 8,262,260 B2 | 9/2012 | Mo et al. |
| 8,475,015 B2 | 7/2013 | Liu et al. |
| 10,788,163 B2 * | 9/2020 | Ramaiah ................ F21V 29/83 |
| 2005/0174480 A1 | 8/2005 | Nakamura |
| 2005/0174780 A1 | 8/2005 | Park |
| 2008/0158887 A1 | 7/2008 | Zhu et al. |
| 2008/0316755 A1 | 12/2008 | Zheng et al. |
| 2009/0046464 A1 | 2/2009 | Liu et al. |
| 2009/0071624 A1 | 3/2009 | Zhang et al. |
| 2009/0103294 A1 | 4/2009 | Zhang et al. |
| 2009/0103308 A1 | 4/2009 | Xu et al. |
| 2009/0154172 A1 | 6/2009 | Zheng et al. |
| 2009/0168418 A1 | 7/2009 | Zheng et al. |
| 2009/0180284 A1 | 7/2009 | Lin et al. |
| 2009/0251901 A1 | 10/2009 | Kuo et al. |
| 2009/0323325 A1 | 12/2009 | Long et al. |
| 2010/0328956 A1 | 12/2010 | Zhang |
| 2012/0287642 A1 | 11/2012 | Zeng |
| 2014/0268826 A1 | 9/2014 | Pickard et al. |
| 2014/0307443 A1 | 10/2014 | Clifford et al. |
| 2014/0340870 A1 | 11/2014 | Premysler |

FOREIGN PATENT DOCUMENTS

| | | |
|---|---|---|
| CN | 202546344 U | 11/2012 |
| CN | 103016983 A | 4/2013 |
| CN | 203615097 U | 5/2014 |
| CN | 104728631 A | 6/2015 |
| WO | 2015129420 A1 | 3/2015 |
| WO | 2015129420 A1 | 9/2015 |

OTHER PUBLICATIONS

International Search Report and Written Opinion issued in connection with corresponding PCT Application No. PCT/US2016/052579 dated Nov. 24, 2016.

International Preliminary Report on Patentability issued in connection with corresponding PCT Application No. PCT/US2016/052579 dated Mar. 27, 2018.

Office Action Issued in connection with corresponding Chinese Application No. 201680054982A dated Nov. 2, 2020.

\* cited by examiner

SOLID STATE LAMP FOR RETROFIT

RELATED APPLICATIONS

This patent application is a continuation of U.S. patent application Ser. No. 15/752,898, filed Feb. 15, 2018, now U.S. Pat. No. 10,788,163, entitled "Solid state lamp for retrofit," which claims priority to PCT Application Ser. No. PCT/US2016/052579, filed on Sep. 20, 2016, entitled "Solid state lamp for retrofit,"and which claims priority to U.S. Provisional Patent Application Ser. No. 62/221,400, filed Sep. 21, 2015, entitled "LED Lamp Design for HID Retrofit," the entire disclosure of each of the aforementioned applications being incorporated herein by reference.

BACKGROUND

The light distribution of a light emitting diode (LED) lamp can be sometimes closely linked to the heat sink design. Design choices of a retrofit LED lamp can require compromising its light distribution to simplify the heat sink design, or the heat sink design can be overdesigned to compensate for an inferior LED driver electronics design.

Many conventional high-intensity discharge (HID) LED retrofit lamps do not have a light distribution similar to a conventional HID lamp. This is sometimes due to the LEDs of these conventional retrofit lamps being distributed in a plane, resulting in an optical distribution that is not capable of providing the omnidirectional lighting of the HID lamp. LED lamp thermal properties are important to the lamp's design. These thermal properties can be primarily a function of the heat sink design, and how heat is extracted from the LEDs and transferred to the ambient environment. Proper thermal design benefits the photometric properties of a LED retrofit lamp.

A LED retrofit lamp for existing HID installations should mimic as closely as possible the optical light distribution of the existing HID lamp it is replacing. What is needed in the art is a retrofit HID LED lamp that balances a suitable optic performance with an acceptable, efficient heat sink design.

DESCRIPTION

While the aspects of the disclosed embodiments are generally described herein with respect to an LED light source, the aspects of the disclosed embodiments apply to any suitable solid-state light source. As used herein, the term "solid-state light source" (or SSL source) includes, but is not limited to, light-emitting diodes (LEDs), organic light-emitting diode (OLEDs), polymer light-emitting diodes (PLEDs), laser diodes, or lasers. In some implementations, the LEDs can be sealed from ambient air to prevent LED sulfuration. In addition, although the figures depict LED light sources, it should be understood that other types of SSL sources could be utilized in some embodiments in accordance with the novel implementations described herein.

In accordance with embodiments, a retrofit HID lamp (hereinafter "retrofit lamp") has an optical distribution truer to a conventional HID lamp than current LED lamps. Embodying retrofit lamps include SSL sources arranged in a circumferential array around the body of the retrofit lamp, with the heat sink located interior to the circumferential array of SSL sources. This arrangement of light sources provides an embodying retrofit lamp with a light distribution that is omnidirectional to closely mimic the light distribution of the conventional HID lamp it is replacing.

Figure 1A:
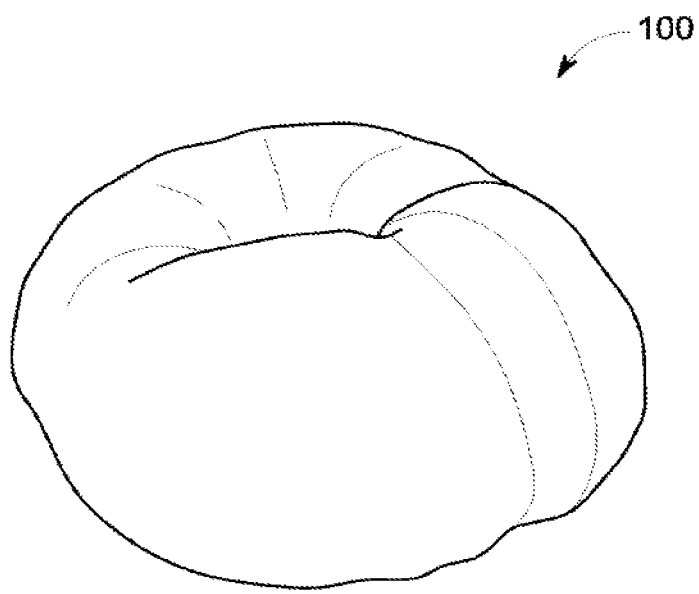
FIG. 1A depicts an optical distribution for a conventional HID lamp.
Figure 1B:
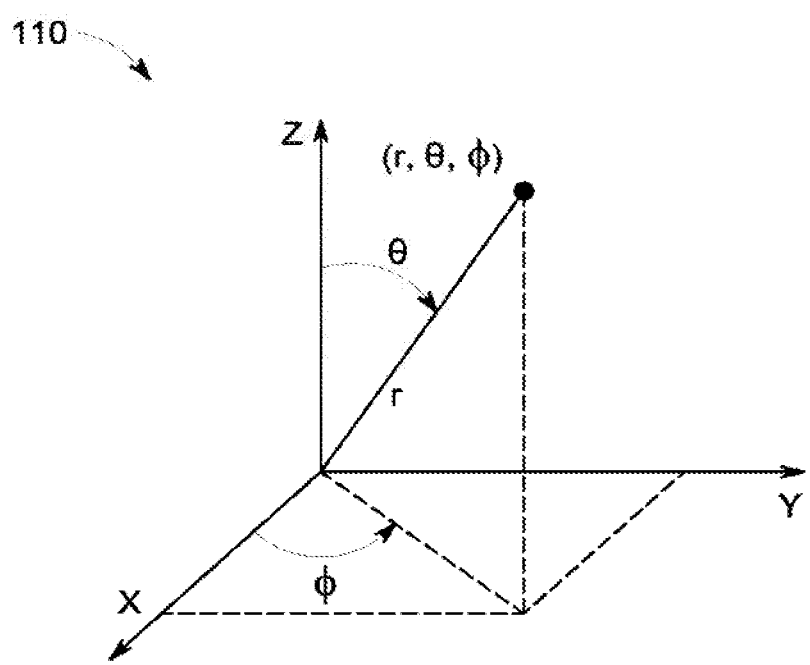
FIG. 1B depicts a coordinate system for the optical distribution depicted in FIG. 1A.

FIG. 1A depicts light distribution 100 for a conventional HID lamp. Each point of light distribution 100 can be described as located within spherical coordinate system 110 (FIG. 1B) by a point (r, θ, φ). Conventional LED HID retrofit lamps do not have a light distribution similar to HID light distribution 100. The conventional LED HID retrofit lamps have the LED light sources distributed in a plane, where the mounting surface for the LED light sources eliminate light distribution behind the mounting surface.

Figure 2:
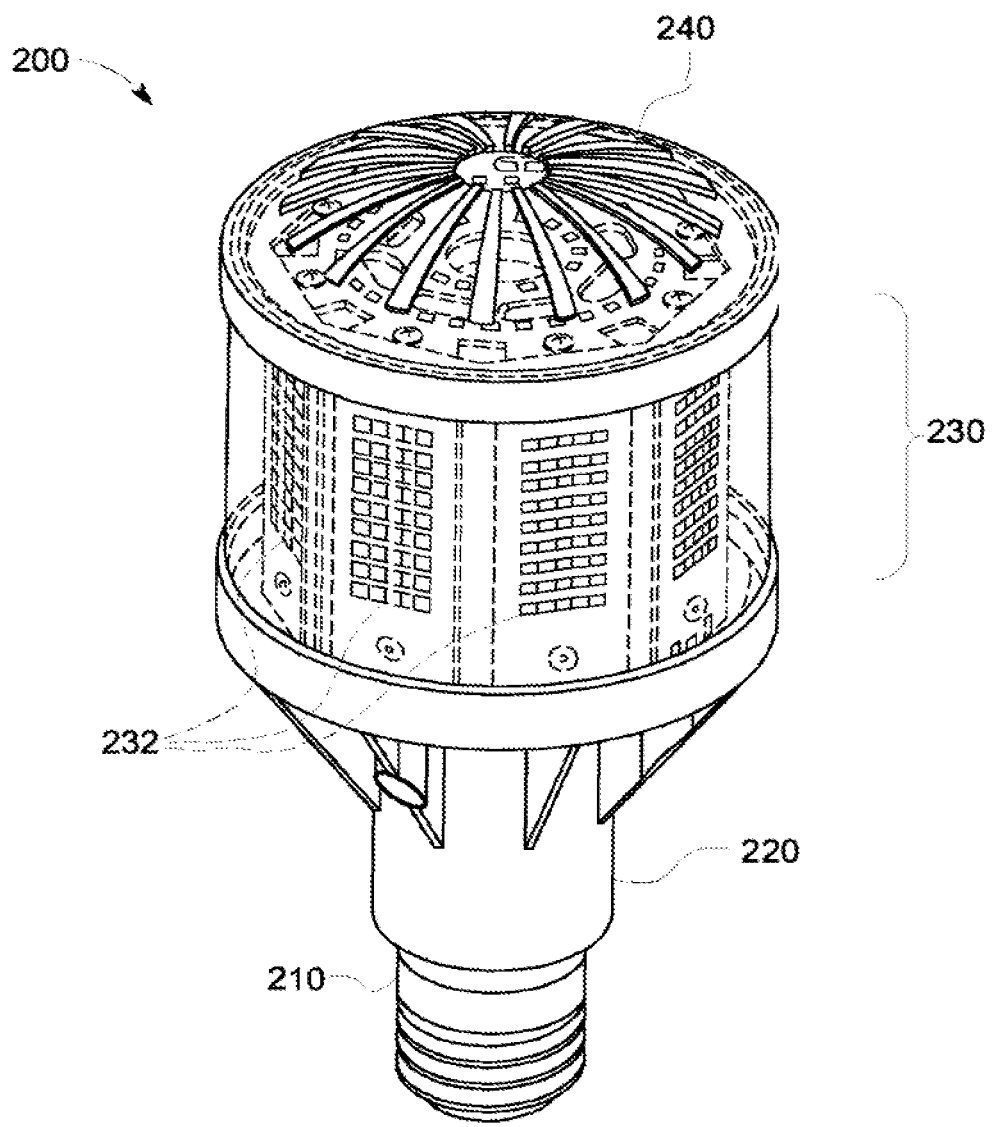
FIG. 2 depicts a perspective view of a retrofit lamp in accordance with embodiments.

FIG. 2 depicts a perspective view of retrofit lamp 200 in accordance with embodiments. An embodying retrofit lamp includes lamp base 210 that completes an electrical connection between the retrofit lamp and a power source when the lamp is connected to a socket of a lighting fixture, and capper assembly 220 located adjacent to the base. Within capper assembly 220 can be located the driver electronics supply. At the distal end of the capper assembly is located circumferential array 230 composed of SSL sources. The SSL sources can be mounted on one or more circuit boards 232 positioned around the circumferential array. In some implementations the circuit boards can be formed from one flexible circuit board conformed to a cylindrical shape. The circumferential array can be covered by an optical transmissive shield (e.g., a polycarbonate shroud, glass, etc.). At the distal end of retrofit lamp 200 is located dome 240.

Figure 6A:
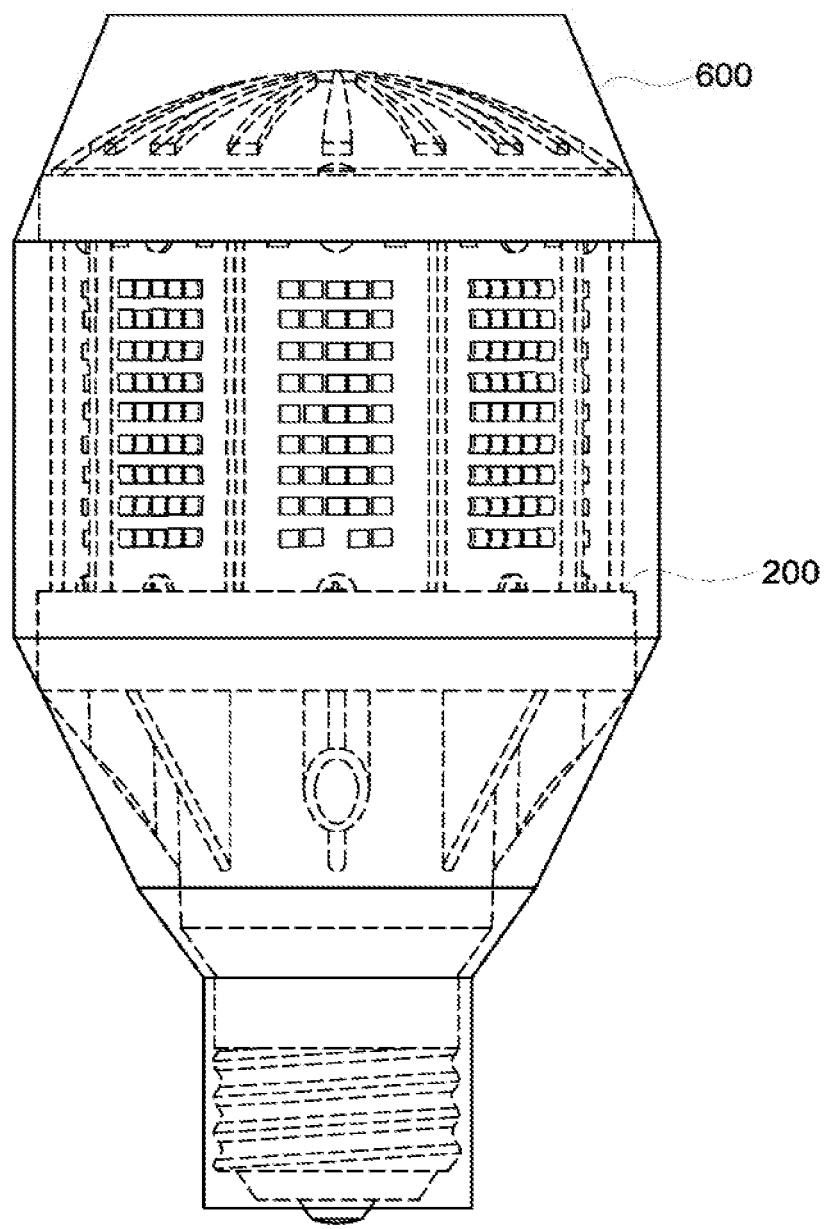
FIG. 6A depicts an embodying retrofit lamp superimposed on a ANSI ED28 form profile.
Figure 6B:
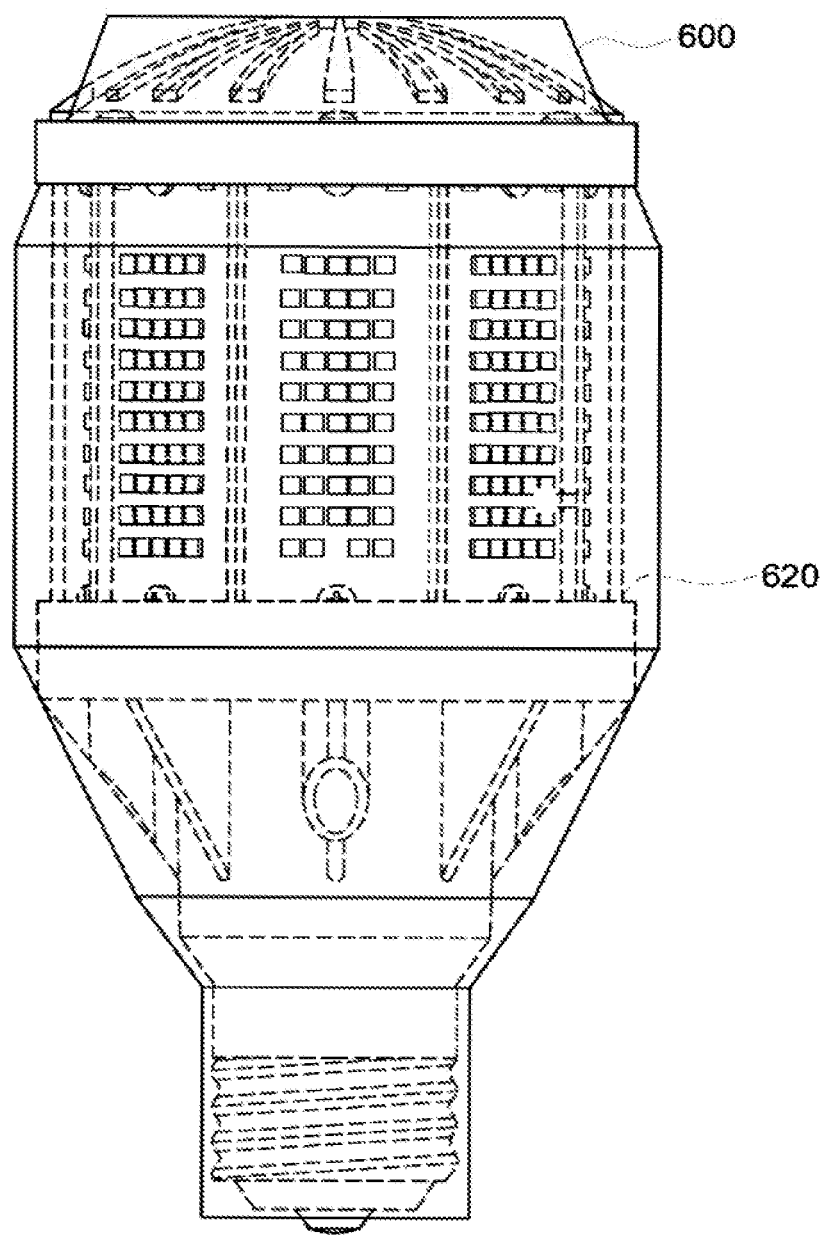
FIG. 6B depicts another embodying retrofit lamp superimposed on the ANSI ED28 profile.

The overall form fit of the retrofit lamp conforms with standards promulgated by the American National Standards Institute (ANSI), so that the lamp can be installed in existing fixtures, both open and enclosed, for conventional HID lamps. FIG. 6A depicts retrofit lamp 200 conforming within ANSI ED28 form profile 600. In some implementations, the retrofit lamp may meet the maximum allowable diameter and length of the ANSI profile, but might exceed the limits of the profile in the corners. FIG. 6B depicts embodying retrofit lamp 620 exceeding ANSI ED28 form profile 600 at its corners. Alternative embodiments of the retrofit lamp can be scaled to fit the form function of ANSI BT/ED17, BT/ED23.5, BT/ED28, BT/ED37, BT56, etc.

In some implementations, a series of secondary SSL sources mounted on circuit boards can be placed on the dome end (distal to the lamp base), to increase the light distribution in the θ plane. The presence of an additional light source(s) on the top of the lamp eliminates a dark spot in the light distribution created when the primary SSL source circuit boards are around the exterior faces of the heat sink. A secondary SSL source circuit board can include at least one aperture (e.g., a hole and/or slot) to allow air to pass through into the interior volume of the LED HID retrofit lamp.

Figure 3A:
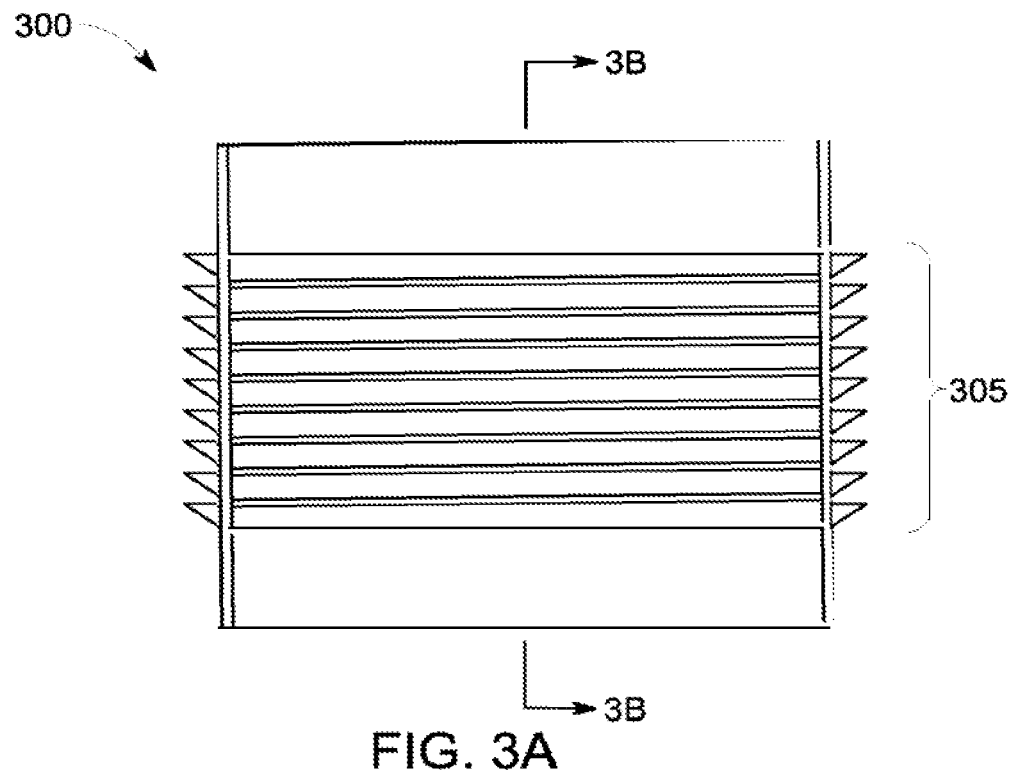
FIG. 3A depicts a perspective view of an optical transmissive shield for the retrofit lamp of FIG. 2 in accordance with embodiments.
Figure 3B:
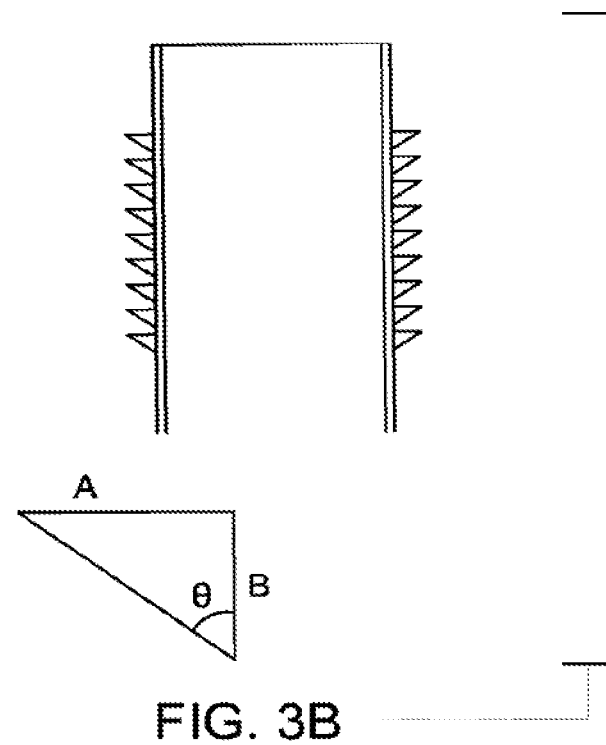
FIG. 3B depicts a cross-sectional view of the optical transmissive shield of FIG. 3A along line 3B-3B in accordance with embodiments.

FIG. 3 depicts a perspective view of optical transmissive shield 300 for LED HID retrofit lamp 200 in accordance with embodiments. The optical transmissive shield can be a clear, or translucent, tube placed to surround circumferential array 230. On the surface of this tube is arranged a series of prismatic structures 305 (shown in cross-section along line 3B-3B in FIG. 3B)

The prism structures direct some of the light in the θ direction. In particular, the transmissive shield depicted in FIG. 3A can increase downlight distribution (i.e., when the lamp is oriented vertical, and base-up (VBU)). By inverting the structure by 180 degrees, the uplight distribution can be increased. In some implementations to produce a more uniform illumination over a broad angular region, half the structure can have alternating groups of prisms facing downward and upward around the circumference of the prism. Additional implementations can include varying the prism extension length (FIG. 3B, length A).

Figure 4:
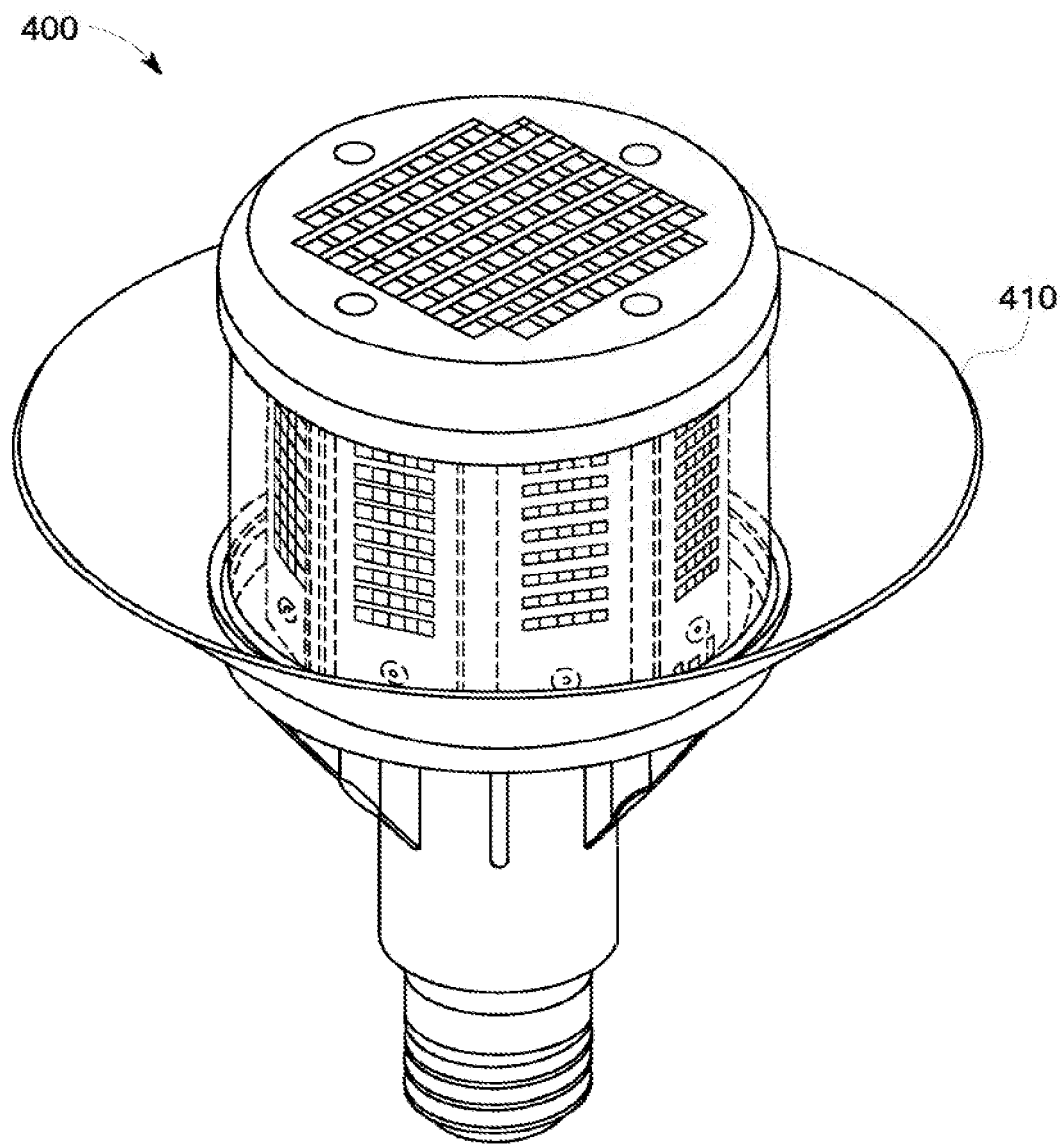
FIG. 4 depicts a perspective view of a retrofit lamp in accordance with embodiments.

FIG. 4 depicts a perspective view of LED HID retrofit lamp 400 in accordance with embodiments. LED HID retrofit lamp 400 includes reflector 410 located about between capper 220 and circumferential array 230. In some implementations reflector 410 can be a conical or parabolic structure, coated on the inside surface with a reflective film; in other implementations reflector 410 can be a diffuse structure. In either implementation, reflector 410 can divert a portion of the LED generated light in the r-φ direction and direct it into the θ direction. Varying the angle of the sloped section can increase or decrease the amount of down-light and its angular distribution. In an alternative embodiment, reflector 410 may be translucent, such that a portion of light is transmitted through the reflector 410. Permitting some light to pass through the reflector 410 allows the surrounding fixture to be illuminated.

Figure 5:
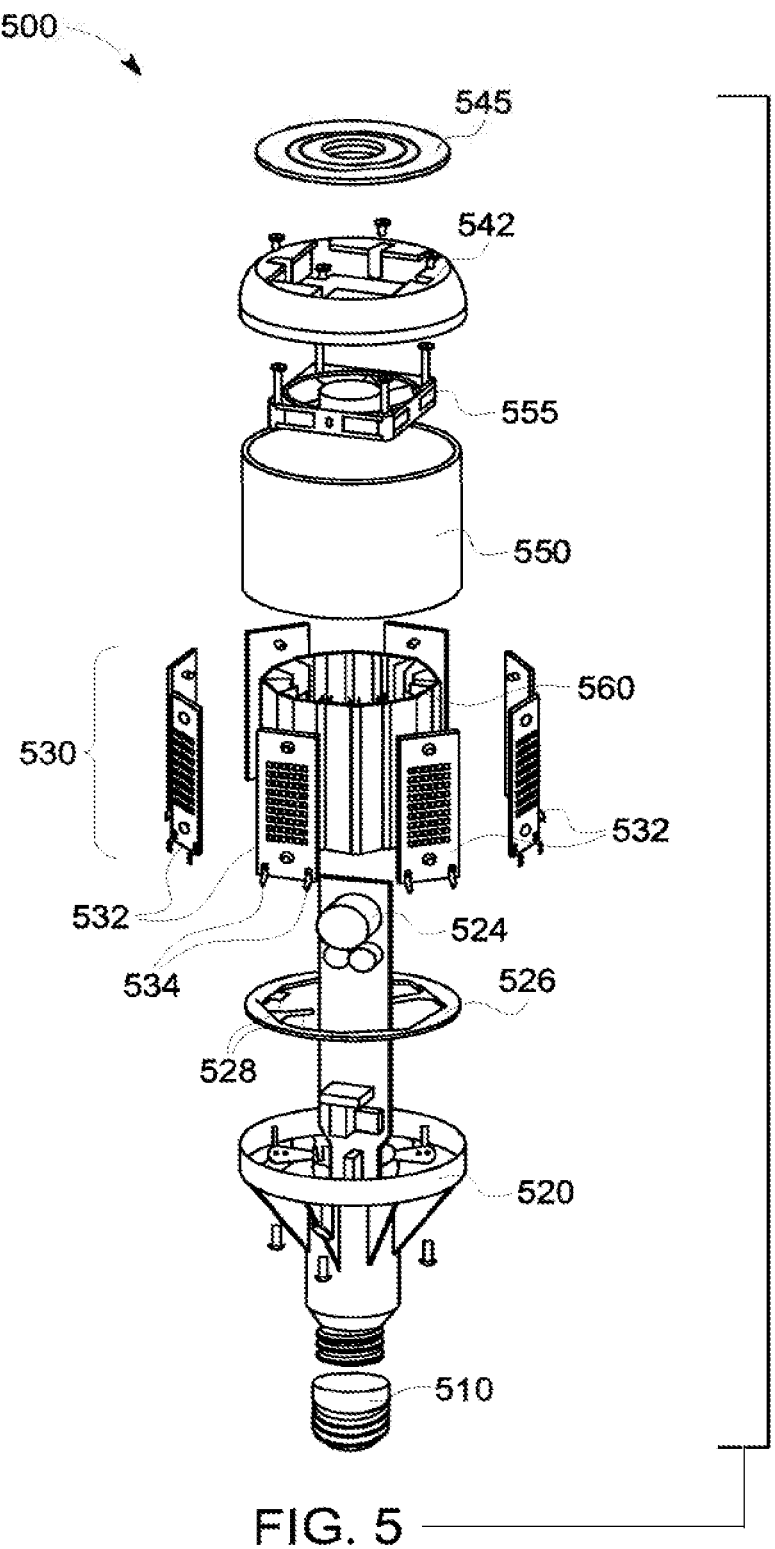
FIG. 5 depicts an exploded view of a retrofit lamp in accordance with embodiments.

FIG. 5 depicts an exploded view of LED HID retrofit lamp 500 in accordance with embodiments. LED HID retrofit lamp 500 includes lamp base 510, and capper assembly 520 located adjacent to the base. Within capper assembly 520 can be located LED driver electronics 524. The LED driver electronics condition the input electrical power to meet the requirements of the LED light sources. At the distal end of the capper assembly is located circumferential array 530 composed of LED light sources. The LED light sources can be mounted on circuit boards 532 positioned around the circumferential array. In some implementations, the circuit boards can be metal-clad printed circuit boards (MCPCB) to provide thermal conductivity away from the LED light engines mounted on the circuit boards.

Electrical power from the LED driver electronics can be distributed to the circuit boards 532 by intermediate printed circuit board (PCB) 526. The power distribution network of the intermediate PCB can be electrically connected to the output of LED driver electronics 524 by wire jumper(s). Each board 532 can be electrically connected to the intermediate PCB by tab(s) 528 located on the intermediate PCB at positions corresponding to electrical input contacts 534 on each of circuit boards 532. These protruding tabs can be mechanically bonded (e.g., soldered, welded, conductively glued, etc.) to the corresponding contacts on respective circuit boards 532 to reduce assembly time and costs, while improving the reliability of the electrical contact between intermediate PCB 526 and circuit boards 532.

Within the interior volume of the SSL retrofit lamp can be located heat sink 560. The heat sink is positioned interior to the circumferential array of SSL sources. The heat sink can include flat external faces and internal fins. The external flat faces are in thermal contact with circuit boards 532. For example, in one embodiment heat sink 560 can have the same amount of external faces as there are SSL circuit boards.

The internal fins increase the heat sink surface area, thereby increasing heat transfer by forced convection from fan 555 positioned within the interior volume to force airflow in a fluidic manner across heat sink 560. The heat sink can be manufactured by an extrusion process, but could also be manufactured—including die-casting, roll forming, and sheet metal bending.

Circumferential array 530 can be covered by optical transmissive shield 550. At the distal end of retrofit lamp 500 can be located top cap 542 and fan guard 545. In some embodiments, the top cap and fan guard can be integrated into a single part. The top cap and fan guard can be in the shape of dome 240 (FIG. 2). In some embodiments, the dome can be flat on top and have a series of vents which are radial spokes or alternatively a square grid or other geometry to have air flow into the lamp's interior volume. The dome can be made from a polycarbonate or other material of sufficient transparency and resistance to heat. In some implementations, the dome can diffuse the light to reduce glare when the lamp is oriented VBU.

The top cap can include a vented region having aperture(s) to supply air flow into the fan. The vent aperture(s) may be circular, square, rectangular, trapezoidal, or other shape which allows air to flow through the lamp efficiently. In order to minimize air flow impedance, it is desirable for the vent aperture(s) to maximize the open area while still preventing external objects from penetrating the lamp. A fine mesh sheet can replace or be added to the vented region to further prevent foreign objects from entering the lamp. Vent aperture(s) in the capper assembly can provide outlets for the forced air. In some implementations the direction of air flow can be reversed.

Other features of the top cap include a plurality of tabs and/or bosses that position the components in place. One set can position the top cap on the heat sink. Another set can position the optical shield around the heat sink. Another set can position the corners of the fan to center it on the heat sink. Some implementations can have four sets of tabs, but as few as two sets of tabs could be used to position all of the components.

In accordance with embodiments, the retrofit lamp can be a direct screw-in replacement for the conventional HID lamp (i.e., the SSL sources operate off the conventional HID ballast). In some implementations, the retrofit lamp can operate off an input line voltage, after the conventional HID ballast is removed prior to installing the retrofit lamp. Accordingly, driver electronics 524 can condition one or both of the line voltage input or the conventional HID ballast output. the LED lamp runs off the HID ballast).

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A solid state lamp comprising:
one or more circuit boards configured as a circumferential array defining an interior volume of the lamp, each circuit board having an interior surface, an exterior surface, a first edge, and a second edge;
solid-state light sources mounted on the exterior surface of the one or more circuit boards;
a heat sink located in the interior volume interior to the circumferential array and including internal fins extending into the interior volume, the heat sink having one or more external faces in thermal communication with the interior surface of the one or more circuit boards;
an active cooling device positioned proximal to the interior volume configured to force airflow across the heat sink;
a capper assembly located proximal to the first edge of the one or more circuit boards, the capper assembly including at least one aperture configured to vent the interior volume; and
a dome assembly located proximal to the second edge, the dome assembly being substantially flat on top and including a secondary circuit board having solid-state light sources, the secondary circuit board including at least one aperture to allow air to pass through into the interior volume.

2. The lamp of claim 1, including a lamp base at an end of the capper assembly opposite the first edge.

3. The lamp of claim 1, including driver electronics within the capper assembly.

4. The lamp of claim 3, further including an intermediate circuit board within the capper assembly, the intermediate circuit board in electrical communication with the driver electronics, the intermediate circuit board configured to distribute electrical power to the one or more circuit boards.

5. The lamp of claim 4, the intermediate circuit board including:
protruding tabs extending inwards from the intermediate circuit board; and
electrical contacts extending from the first edge of the one or more circuit boards.

6. The lamp of claim 1, including a reflector between the circumferential array and the capper assembly.

7. The lamp of claim 6, the reflector having a reflective film coated on a first surface of the reflector.

8. The lamp of claim 1, the one or more circuit boards being metal-clad printed circuit boards.

9. The lamp of claim 1, the one or more circuit boards being a flexible circuit board conformed to an external profile of the heat sink.

10. The lamp of claim 1, the SSL source being one of a light emitting diode, an organic light-emitting diode, polymer light-emitting diodes, a laser diode, and a laser.

11. The lamp of claim 1, the active cooling device being a fan.

12. The lamp of claim 1, wherein the lamp fits the form function of ANSI BT/ED17, BT/ED23.5, BT/ED28, BT/ED37, ED28, or BT56.

13. A lamp comprising:
one or more circuit boards configured as a circumferential array defining an interior volume of the lamp, each circuit board having an interior surface, an exterior surface, a first edge, and a second edge;
solid-state light sources mounted on the exterior surface of the one or more circuit boards;
a heat sink located in the interior volume interior to the circumferential array and including internal fins extending into the interior volume, the heat sink having one or more external faces in thermal communication with the interior surface of the one or more circuit boards;
an active cooling device positioned proximal to the interior volume configured to force airflow across the heat sink;
a capper assembly located proximal to the first edge of the one or more circuit boards, the capper assembly including at least one aperture configured to vent the interior volume; and
a dome assembly located proximal to the second edge, the dome assembly being substantially flat on top and including a secondary circuit board having solid-state light sources, the secondary circuit board including at least one aperture to allow air to pass through into the interior volume, wherein the dome assembly includes at least one vent for air flow into the interior volume.

14. The lamp of claim 13, further comprising driver electronics within the capper assembly.

15. The lamp of claim 13, wherein the lamp fits the form function of ANSI BT/ED17, BT/ED23.5, BT/ED28, BT/ED37, ED28, or BT56.

16. A lamp comprising:
one or more circuit boards configured as a circumferential array defining an interior volume of the lamp, each circuit board having an interior surface, an exterior surface, a first edge, and a second edge;
solid-state light sources mounted on the exterior surface of the one or more circuit boards;
a heat sink located in the interior volume interior to the circumferential array and including internal fins extending into the interior volume, the heat sink having one or more external faces in thermal communication with the interior surface of the one or more circuit boards;
an active cooling device positioned proximal to the interior volume configured to force airflow across the heat sink;
a capper assembly located proximal to the first edge of the one or more circuit boards, the capper assembly including driver electronics within the capper assembly; and
a dome assembly located proximal to the second edge, the dome assembly including a secondary circuit board having solid-state light sources, the secondary circuit board including at least one aperture to allow air to pass through into the interior volume.

17. The lamp of claim 16, wherein the dome assembly being substantially flat on top.

* * * * *